(12) United States Patent
Heider et al.

(10) Patent No.: US 11,933,101 B1
(45) Date of Patent: Mar. 19, 2024

(54) WINDOW FOR A TRAILER OR OTHER VESSEL WITH A SIDE WALL

(71) Applicants: Leon Heider, Humboldt, IA (US); Scott Heider, Humboldt, IA (US); Ross Heider, Humboldt, IA (US); Kevin Heider, Humboldt, IA (US); Benjamin F. Nedved, Humboldt, IA (US)

(72) Inventors: Leon Heider, Humboldt, IA (US); Scott Heider, Humboldt, IA (US); Ross Heider, Humboldt, IA (US); Kevin Heider, Humboldt, IA (US); Benjamin F. Nedved, Humboldt, IA (US)

(73) Assignee: Jet Co. Inc., Humboldt, IA (US)

( * ) Notice: Subject to any disclaimer, the term of this patent is extended or adjusted under 35 U.S.C. 154(b) by 903 days.

(21) Appl. No.: 16/935,800

(22) Filed: Jul. 22, 2020

(51) Int. Cl.
*E06B 3/58* (2006.01)
*B60J 1/10* (2006.01)
*B60P 3/00* (2006.01)
*B63B 19/02* (2006.01)
*B63B 19/00* (2006.01)

(52) U.S. Cl.
CPC .................. *E06B 3/58* (2013.01); *B60J 1/10* (2013.01); *B60P 3/00* (2013.01); *B63B 19/02* (2013.01); *B63B 2019/0053* (2013.01)

(58) Field of Classification Search
CPC ...... E06B 3/58; E06B 7/30; B60J 1/10; B60P 3/00; B63B 19/02; B63B 2019/0053
USPC .......................................... 114/177; 296/201
See application file for complete search history.

(56) References Cited

U.S. PATENT DOCUMENTS

| 1,669,110 | A | 5/1928 | Wencel |
| 3,625,390 | A | 12/1971 | Meginnis |
| 5,362,186 | A | 11/1994 | Peroni |

(Continued)

FOREIGN PATENT DOCUMENTS

| CN | 101581193 A | * 11/2009 | ............... E06B 7/30 |
| CN | 203903126 U | 10/2014 | |

OTHER PUBLICATIONS

"Grain Trailer Parts" (online product listing). Window, Window Ring, Retaining, and Window Ring, Spacer, https://shop.wilsontrailer.com/product-category/grain-trailer-parts/page/2/, dated Aug. 14, 2020, 2 pages. Retrieved from Internet Archive Wayback Machine https://web.archive.org/web/20200814073949/https://shop.wilsontrailer.com/product-category/grain-trailer-parts/page/2/ on Oct. 13, 2023.

(Continued)

*Primary Examiner* — Anthony D Wiest
(74) *Attorney, Agent, or Firm* — Nyemaster Goode P.C.

(57) ABSTRACT

A window for a grain trailer, having an oval-shaped stem with a perimeter to fit within a hole of a grain trailer having similar size and shape, the perimeter substantially uniform throughout a length of the window, an integrally-formed flange on one end of the stem, the flange having a perimeter that extends outwardly from the perimeter of the stem, a groove adjacent an end of the window and having a perimeter that extends inwardly from the perimeter of the stem. a bracket to fit within the groove and against an inside wall of the grain trailer to prevent the window from sliding out of the grain trailer, a compressible seal against a surface of the flange that faces toward the groove and seals the hole of the grain trailer such that dust and other particles cannot ingress into an interior of the grain trailer.

20 Claims, 11 Drawing Sheets

(56) References Cited

U.S. PATENT DOCUMENTS

| | | | |
|---|---|---|---|
| 5,735,168 A | 4/1998 | Harrison | |
| 5,782,524 A | 7/1998 | Heider et al. | |
| 5,974,877 A | 11/1999 | Burgess | |
| 6,499,439 B1 | 12/2002 | Kohler et al. | |
| 6,851,379 B2 * | 2/2005 | Black | B63B 19/08 |
| | | | 49/504 |
| 8,959,999 B2 | 2/2015 | Haskins | |

OTHER PUBLICATIONS

"Timpte Trailer accessories" (online product listing). Window Assembly (Sight Glass) Part No. 577-41182. <https://store.timpte.com/browse?node=9758>.1 page. Jul. 2, 2016. Retrieved from Internet Archive Wayback Machine <Timpte | Browse Trailer Accessories (archive.org)> on Oct. 16, 2023.

"Thunderstone manufacturing 2019 Parts Catalog" (online catalog). Universal Sight Glass Window. <Thunderstone 2019 Parts Catalog by Timpte, Inc.—Issuu>. pp. 44-45. Jan. 1, 2019. Retrieved on Oct. 16, 2023.

"Grain Brochure", Wilson Trailer, Trailer Window, 2015.

* cited by examiner

WINDOW FOR A TRAILER OR OTHER VESSEL WITH A SIDE WALL

BACKGROUND

Grain or other commodity trailer windows can be difficult to install and maintain. The windows may be poorly designed such that one cannot see through them, they may be poorly placed such that the user cannot determine the amount of grain within the trailer, and they may allow dirt, dust, and other particles within them such that one can no longer see through them.

SUMMARY OF THE PRESENT DISCLOSURE

One aspect of the present disclosure includes a grain trailer having a side wall comprising at least one material thickness, and having an inside surface and an outside surface, a transparent window having a stem having a length and a width, and an inside surface and outside surface, a holding flange disposed at the outside surface and having a length that is longer than the length of the stem and a width that is wider than the width of the stem, a groove adjacent the inside surface of the stem and having a length that is shorter than the length of the stem and a width that is narrower than the width of the stem, a compressible seal disposed between the holding flange and the outside surface of the side wall, a bracket having an inner length and an inner width, and having an outer length and width, the bracket inner width and length being between the length and width of the groove and the stem, and the bracket outer length and width being greater than the length and width of the stem, where the bracket is fixed to the side wall.

Another aspect of the present disclosure includes a window for a grain trailer, having an oval-shaped stem with a perimeter to fit within a hole of a grain trailer having similar size and shape, the perimeter substantially uniform throughout a length of the window, an integrally-formed flange on one end of the stem, the flange having a perimeter that extends outwardly from the perimeter of the stem, a groove adjacent an end of the window and having a perimeter that extends inwardly from the perimeter of the stem. a bracket to fit within the groove and against an inside wall of the grain trailer to prevent the window from sliding out of the grain trailer, a compressible seal against a surface of the flange that faces toward the groove and seals the hole of the grain trailer such that dust and other particles cannot ingress into an interior of the grain trailer.

Yet another aspect of the present disclosure includes a vessel having a side wall with an inside surface and an outside surface. The wall has a transparent window. The window includes a stem having a stem perimeter, and an inside surface and outside surface, a holding flange at the outside surface and having a holding flange perimeter larger than the stem perimeter, a groove adjacent to the inside surface of the stem and having an inner perimeter that is fully contained within the stem perimeter. The wall includes a compressible seal disposed between the holding flange and the outside surface of the side wall, and a bracket having an inner bracket perimeter, the bracket inner perimeter being between the inner perimeter of the groove and the stem perimeter. The bracket is fixed to the side wall.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5A is a top view of a window of a Grain Bin Window.

DETAILED DESCRIPTION OF EMBODIMENTS

Figure 1:
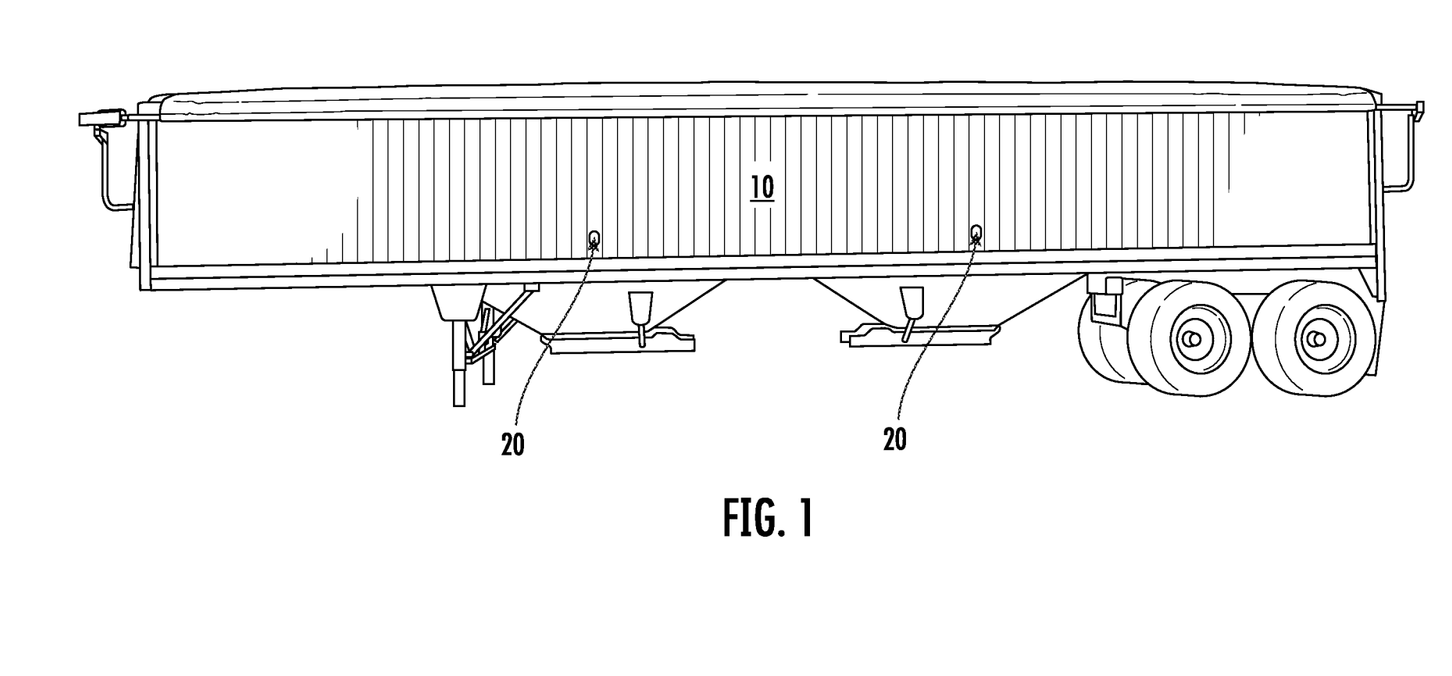
FIG. 1 is a side view of a grain trailer with two windows of an embodiment installed.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Grain trailers or commodity trailers (used generically throughout as "grain trailers") like that shown in FIG. 1 are large truck-pulled trailers with a bottom upon which grain or another commodity like grain is stacked, and four walls (front and rear, and left and right sides) that keep the grain stored within the trailer. Typically, the trailers include a hopper or hoppers at the bottom of the trailer or the rear wall may be openable to allow grain to fall in a controlled manner out of the back of the trailer. The trailer walls 10 are typically made of aluminum or other opaque materials that make it difficult if not impossible to see the level of grain within the trailer or bin. Typically, the walls are a composite of a number of elements.

Figure 2:
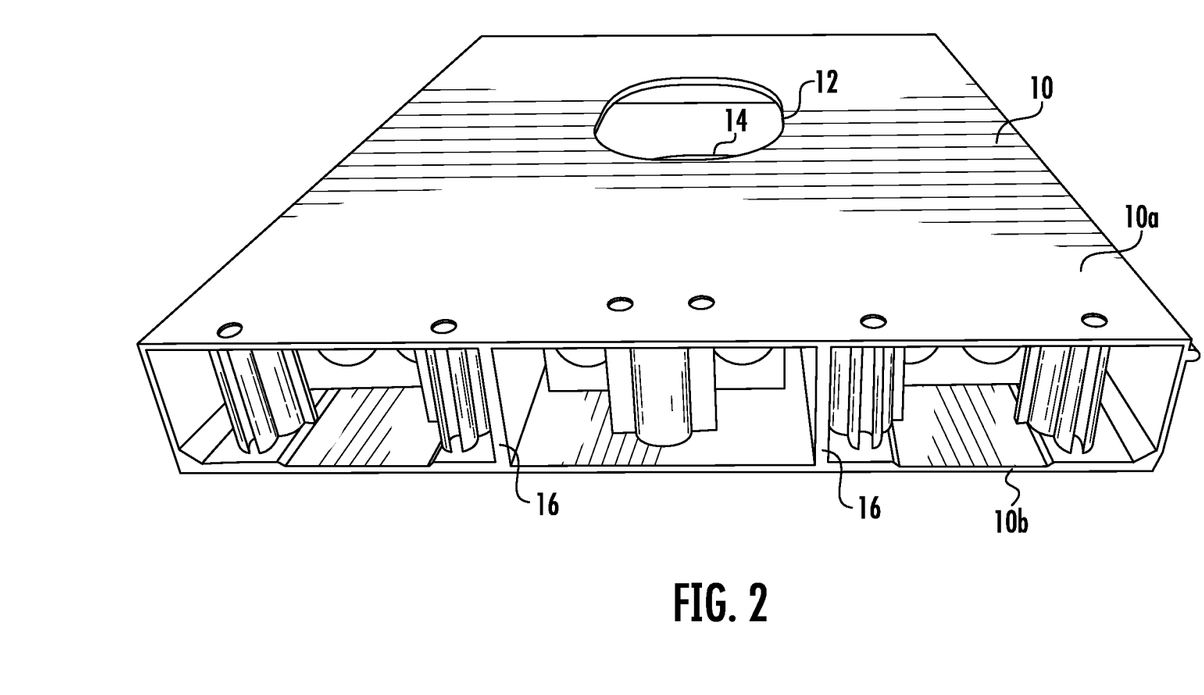
FIG. 2 is a cutaway view of a typical grain trailer wall with a hole.

As shown in FIG. 2, the wall 10 may include an outer panel 10*a* and an inner panel 10*b*. The inner and outer panels 10*a*, 10*b* may be connected by stringers 16. The trailer wall may be manufactured by an extrusion process such that the inner panel 10*a*, the outer panel 10*b*, and the stringers 16 are integrally formed. FIG. 2 shows a small portion of the trailer wall, a person of ordinary skill in the art recognizes that the wall 10 may be formed by much larger pieces, or may be formed by many extrusions that are connected by any fashion known in the art.

The trailer wall 10 may include an outer hole 12 and an inner hole 14. These holes may be formed during the extrusion process or may be cut in later in a fashion known in the art. The inner and outer holes 12, 14 typically have an oval racetrack-type shape, with round ends interconnected by straight portions. In other embodiments, the holes may be round, oval, square, or any other shape known in the art. There may be a number of holes placed at strategic locations on the grain trailer wall that allow a person to see how high the grain is within a trailer without having to look down from above the trailer or by other inconvenient means. For instance, as shown in FIG. 1, there are two holes near the bottom of the trailer at the front and rear of the trailer. In another embodiment, there are two holes 12 placed at a lower location and a higher location in a grain trailer. In another embodiment, there are low and high placed holes 12 at different longitudinal locations along the length of the trailer. In still another embodiment, there are holes placed on both the left and right side walls of the grain trailer, or in any combination thereof that allows the user to easily see the height of the grain within the trailer. More typically, there are two holes 12 at the front of the trailer at high and low locations, and two in the rear of the trailer at low and high locations.

Figure 3:
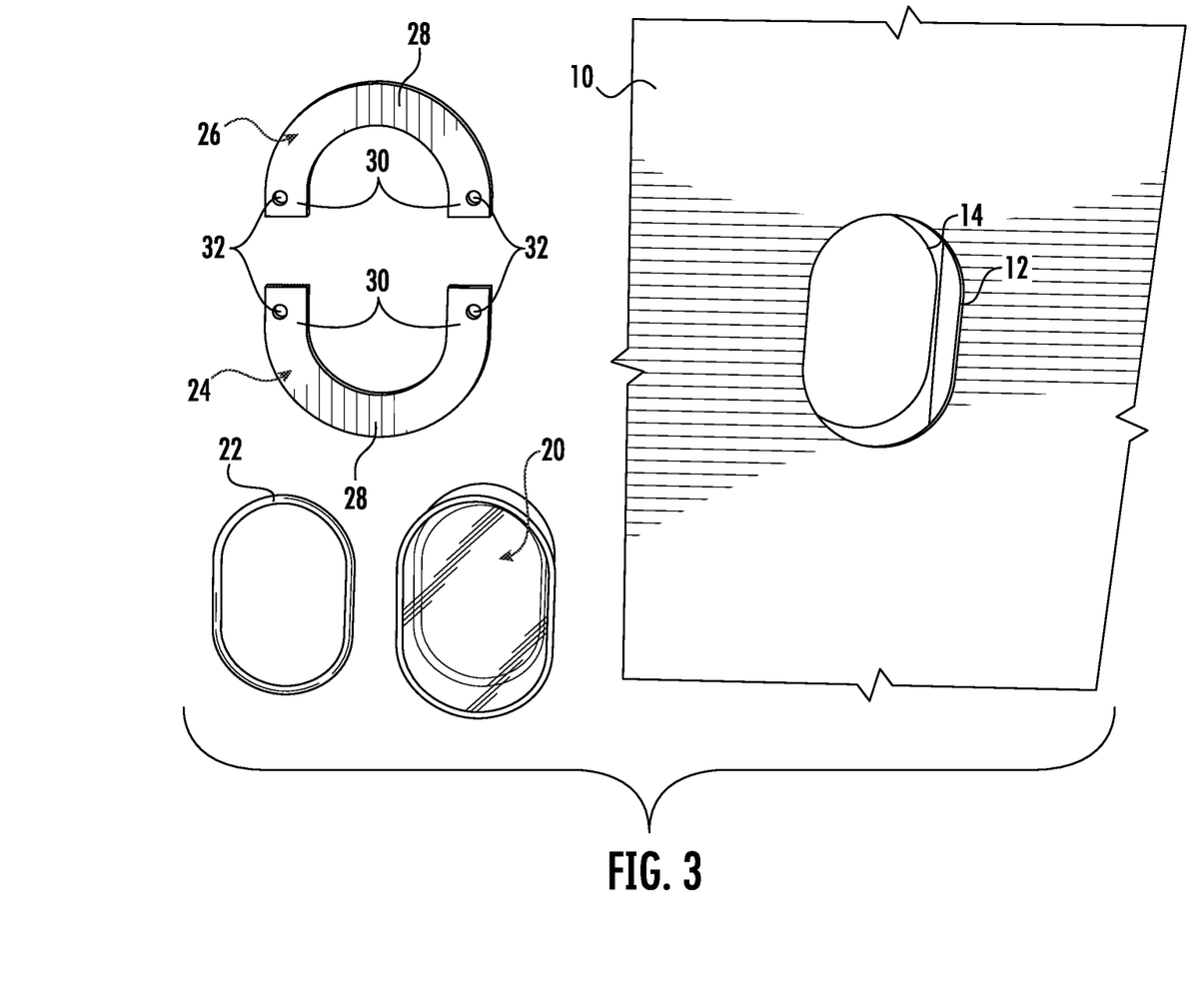
FIG. 3 is a disassembled view of a grain trailer wall and a window of an embodiment of the Grain Bin Window.
Figure 4:
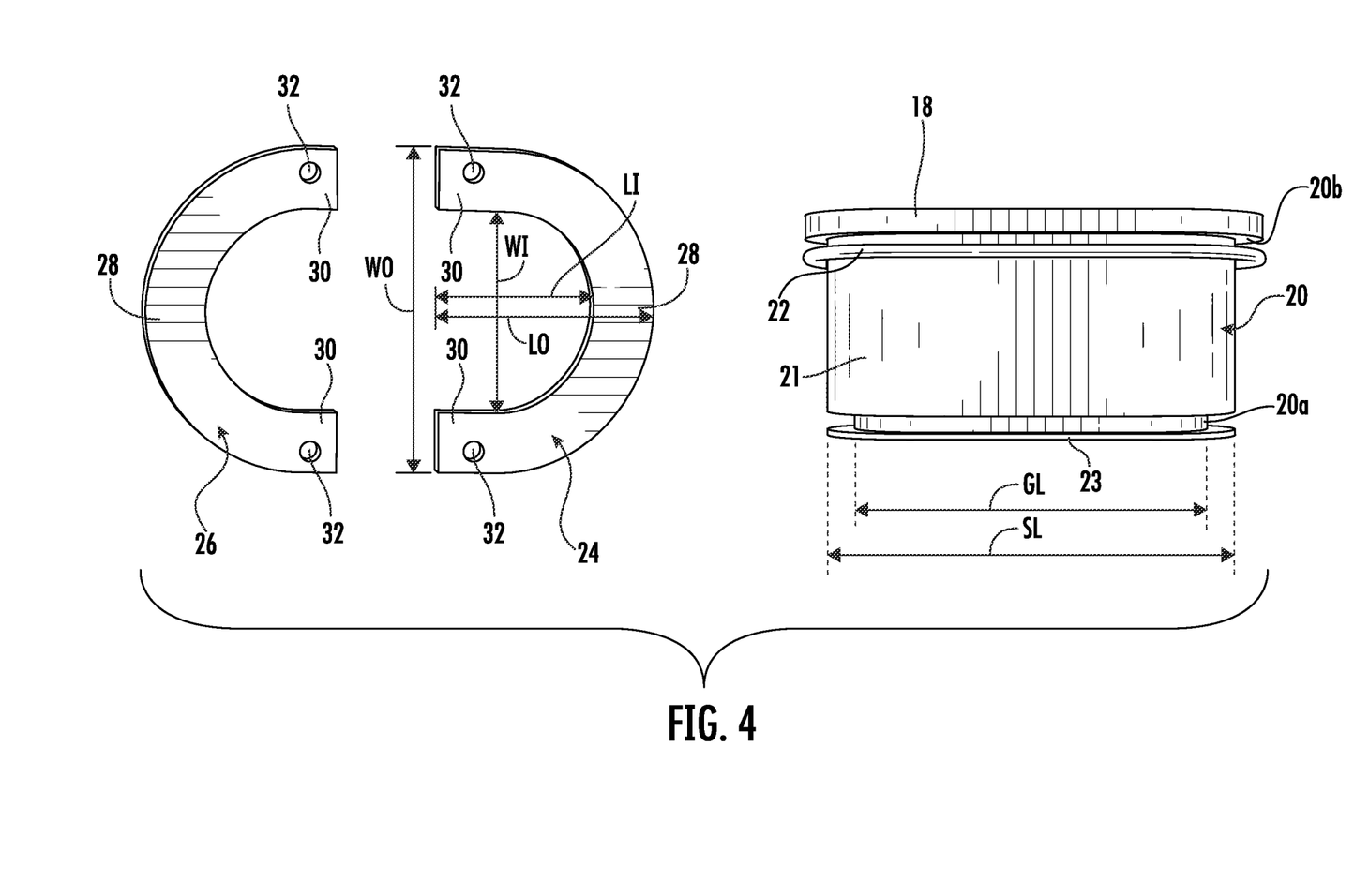
FIG. 4 is a side view of brackets and a top view of a window of an embodiment of the Grain Bin Window.

Looking closely at FIG. 2, because holes in the side of a grain trailer would allow grain to spill out of the grain trailer, transparent windows 20 like those shown in FIGS. 3-4 may be installed within the holes 12. Installing windows within a grain trailer or a bin that is more than a single sheet of material such as aluminum or steel or any other material known in the art presents a unique problem in that one has at least two thicknesses of material to see through. Therefore, disclosed is a method and apparatus to easily install at least one transparent window 20 within the hole 12 and ensure that the grain within the trailer stays within, and dust, dirt, and other particles from outside the grain trailer stays without.

Figure 5A:
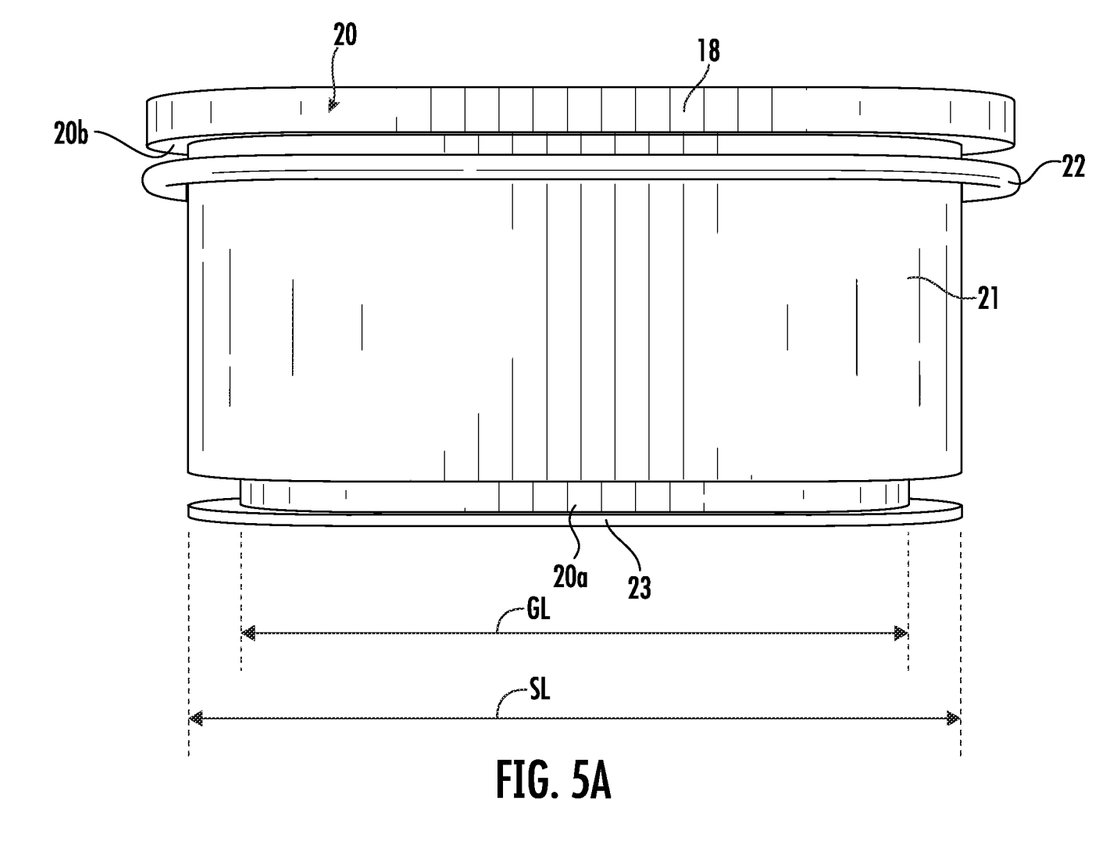
FIG. 5A is a side view of a window of a Grain Bin Window.
Figure 5B:
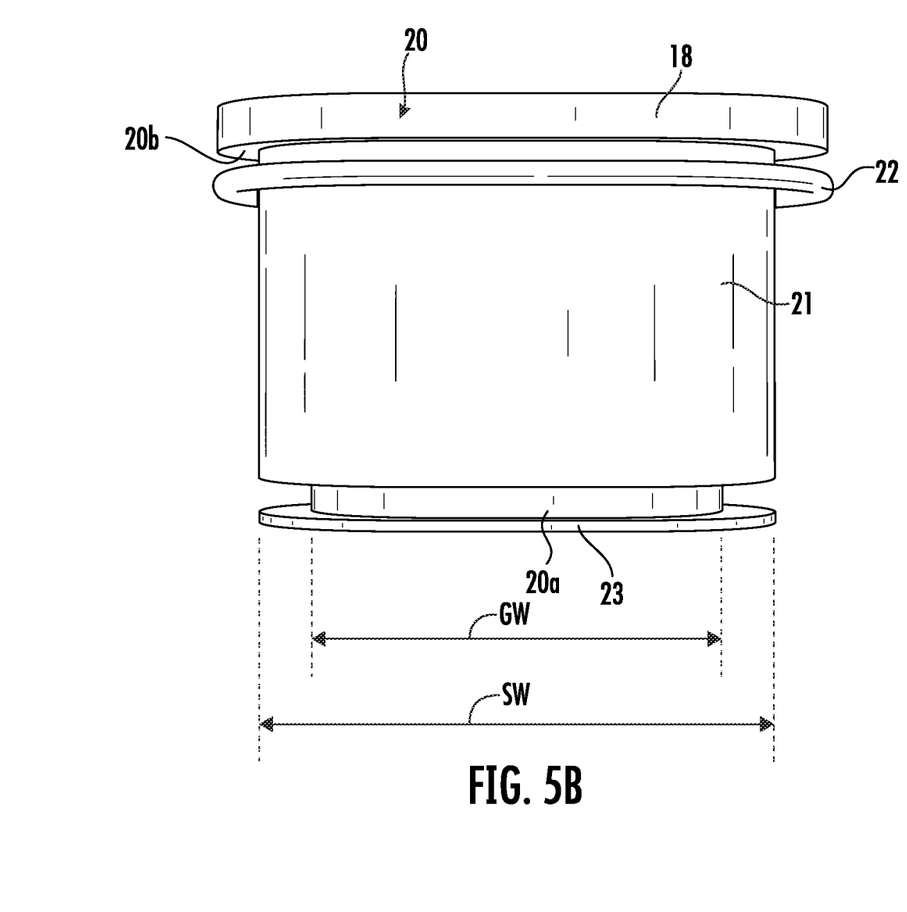
FIG. 5C is a side view of a window and brackets of an embodiment of the Grain Bin Window.
Figure 5C:
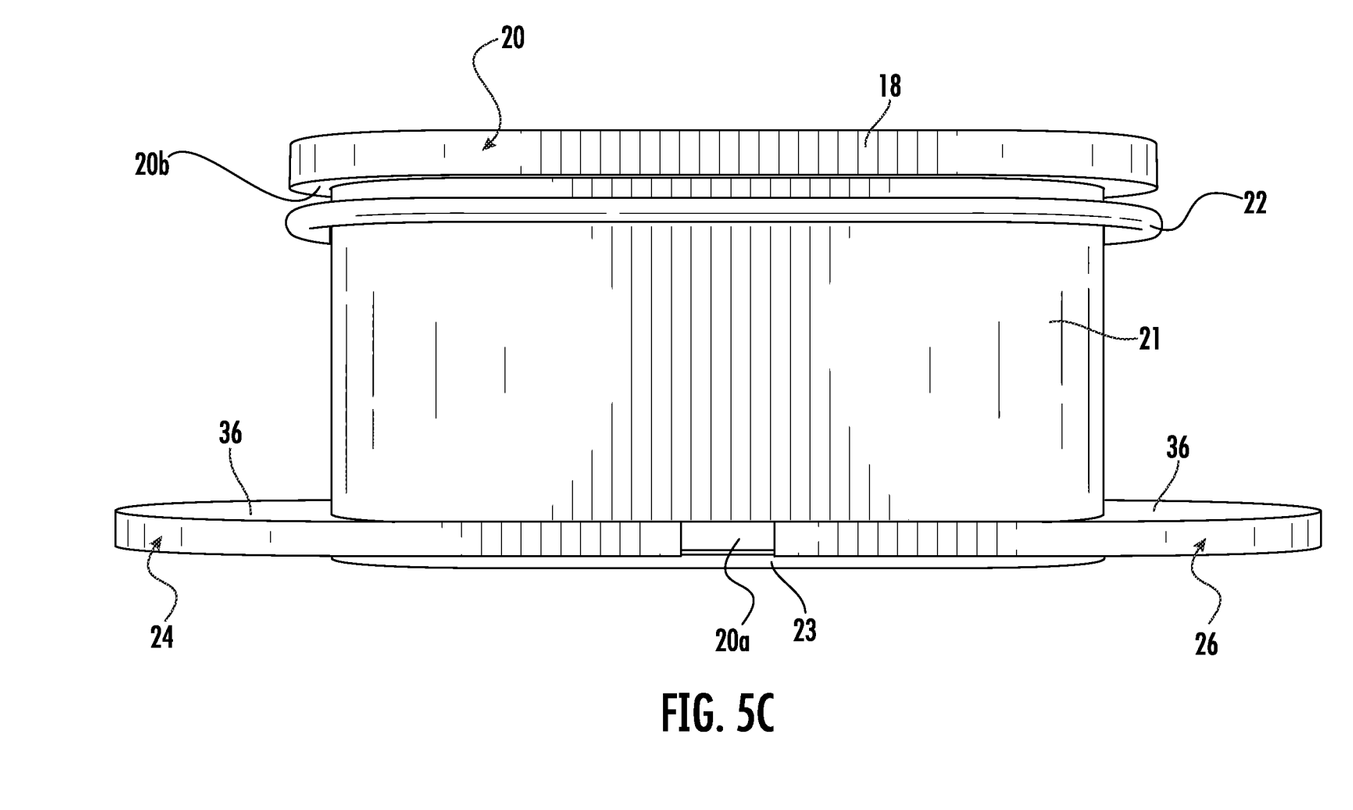

FIG. 3 shows a disassembled view of the window assembly as disclosed. As shown in FIGS. 3 and 4, the window assembly of the present disclosure includes a transparent window 20 with a main stem portion 21 (which is the substantially uniform thickness of the window 20), a holding flange 20b on the outside side of the window that extends beyond the perimeter of the main stem portion 21, and a groove 20a adjacent to the inside end of the window 20. Adjacent in this respect means that the groove is close enough to the inside end of the window so that there is not an excessive amount of the inside of the window sticking within the trailer, while leaving enough of a flange of the stem at the inside end of the window to support the window 20 and keep it from falling or being pushed out of the trailer wall hole 12. The groove 20a extends around the stem and recessed. As shown in FIG. 4, the groove 20a has both a smaller length GL and width GW than the rest of the stem, which has a stem length 5L and a stem width SW, and is formed between an end portion of the stem 23 and the main stem portion 21. The groove, which is a recessed section of the stem substantially retains the same shape as the stem exterior to the groove while being smaller in dimension. The groove has a groove length GL and a groove width, which are shown in FIGS. 4-5C.

Looking at FIGS. 3 and 4, the window assembly includes a compressible seal 22 disposed against the holding flange 20b formed by the circumferential protruding portion 18 that extends beyond the stem on all sides of the window 20 on one end thereof. The compressible seal 22 is disposed against the flange 20b in order to keep dirt, dust, and other particles from ingress into the grain trailer. The window assembly also includes at least one, more typically two inner brackets 24, 26 that slidably fit within the groove 20a, which is disposed proximate the end of the stem opposite the circumferential protruding portion 18. As shown in FIG. 5, the thickness of the brackets and the groove is designed such that the thickness of the brackets 24, 26 is very close to but less than or equal to the width of the groove 20a such that the brackets have an interference fit within the groove. The thickness of the brackets is smaller than the width of the brackets from the inner perimeter to the outer perimeter of the brackets. The brackets 24, 26 may also include through-holes 32 configured to allow a fastener to be placed through the brackets 24, 26 and hold the brackets against the inside 10b of the trailer wall 10, and by extension hold the window 20 in place within the hole 12 in the trailer wall 10. The brackets 24, 26 shown in the figures are U-shaped brackets having curved portions 28 and straight portions 30 extending away from the curved portions with the through-holes 32 at the distal end of the straight portions 30. The curved portions 28 fit with curves of the window. The straight portions 30 fit with the longer vertical side of the window.

Figure 6:
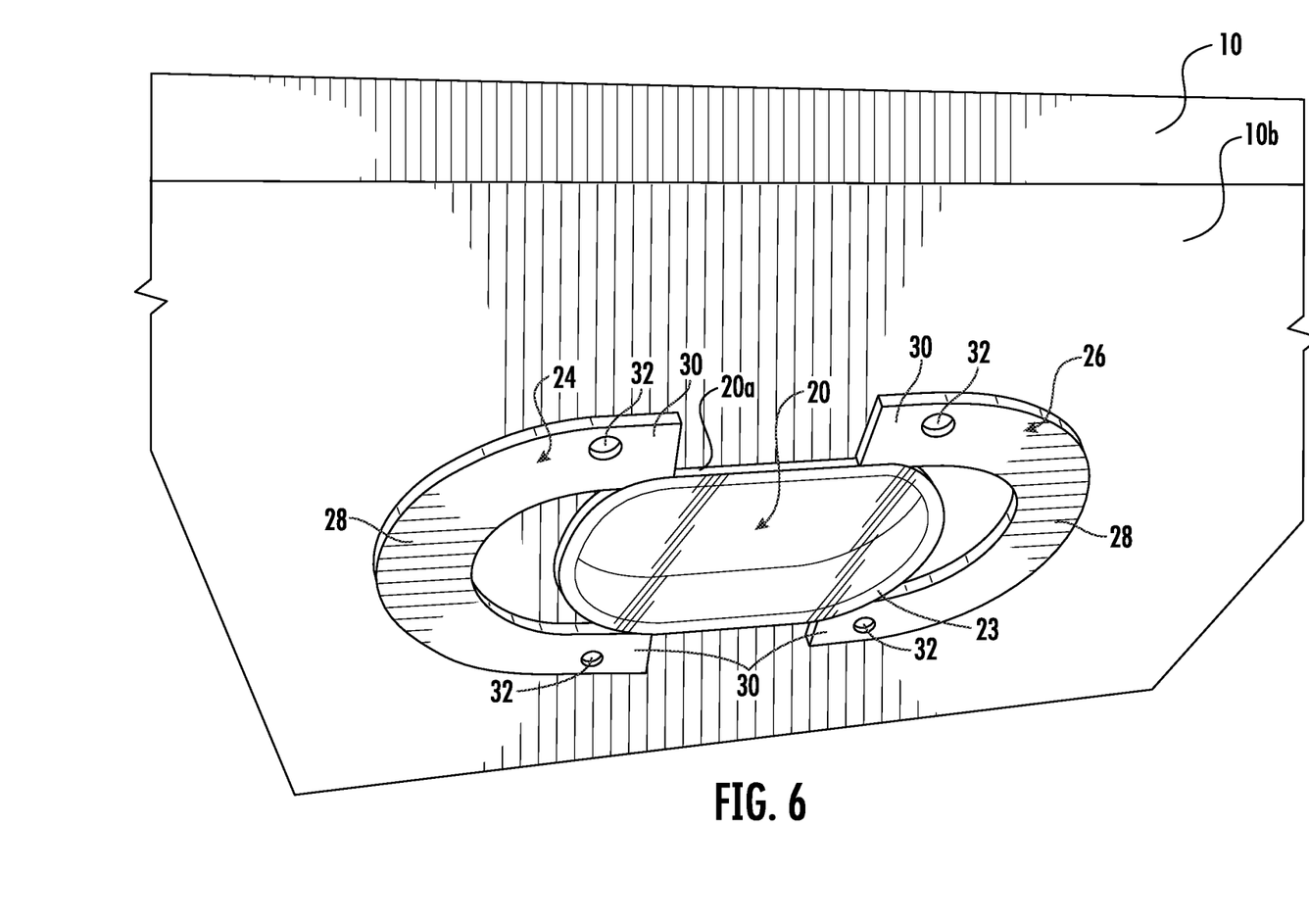
FIG. 6 is a top perspective view of a partially-installed window within a grain trailer wall of an embodiment of the Grain Bin Window.

Installation of the window assembly into the trailer starts with the placement of the compressible seal 22 on the window 20 as shown in FIG. 4, and placed against the holding flange 20b. The window 20 may then be placed from the outside of the grain trailer into the hole 12 such that the inner end 23 of the window 20 and the groove 20a extend into the inside of the trailer wall 10. As shown in FIG. 6, now from the inside of the trailer, the window 20 is pulled toward the inside 10b of the trailer wall 10, such that the compressible seal 22 is pulled tight against the outside surface 10a of the trailer wall 10.

Figure 7:
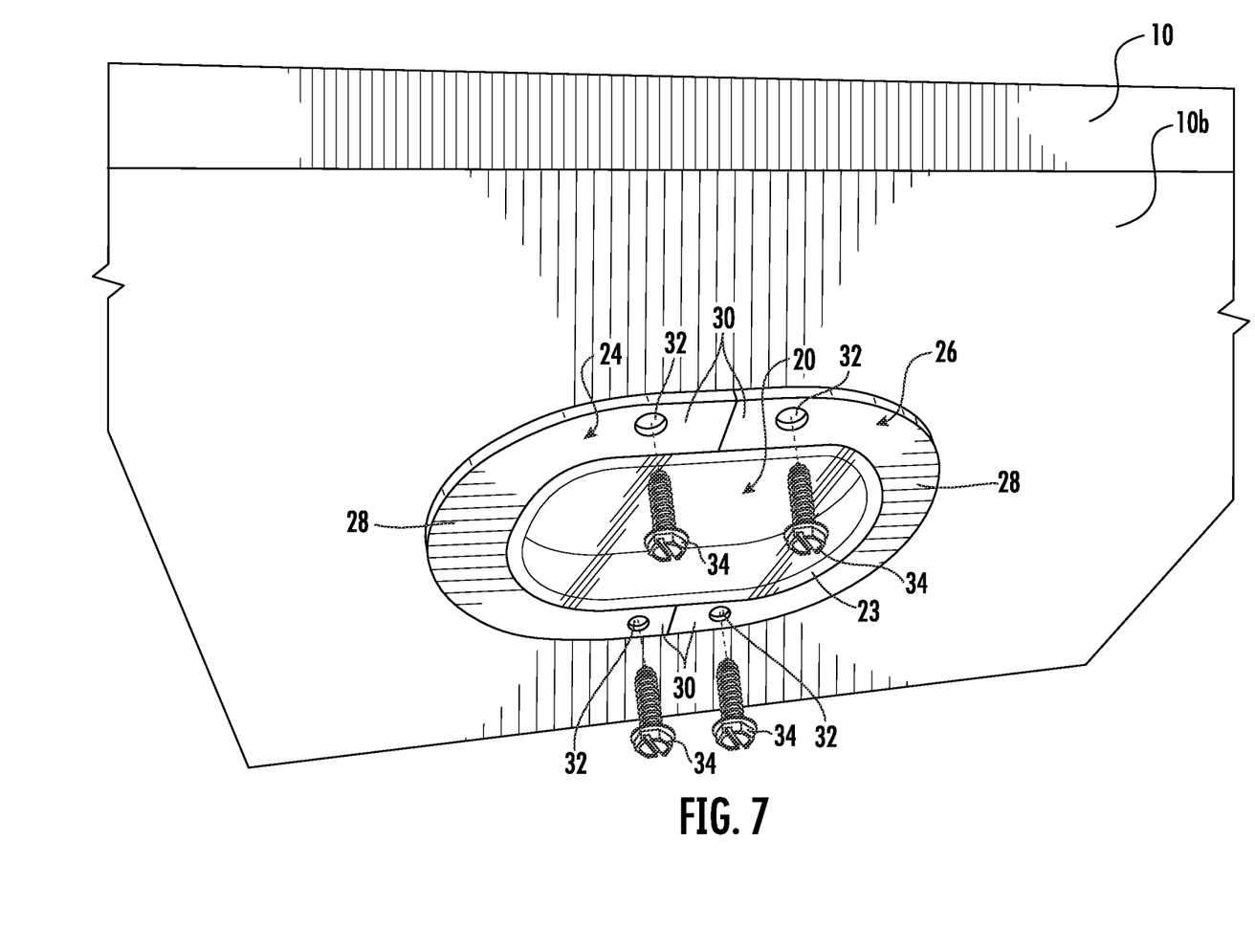
FIG. 7 is a top perspective view of an installed window from the inside of a grain trailer wall of an embodiment of the Grain Bin Window.

Still looking at FIG. 6, the first bracket 24 is placed within the groove 20a of the window and pushed such that the curved end of the bracket 24 is pushed against the curved end of the groove 20a (as shown in FIG. 7). The second bracket 26 is placed on the opposite side of the inside end of window 20 within the groove 20a of the window and pushed such that the curved end of the bracket 24 is pushed against the opposite curved end of the groove 20a.

Figure 8:
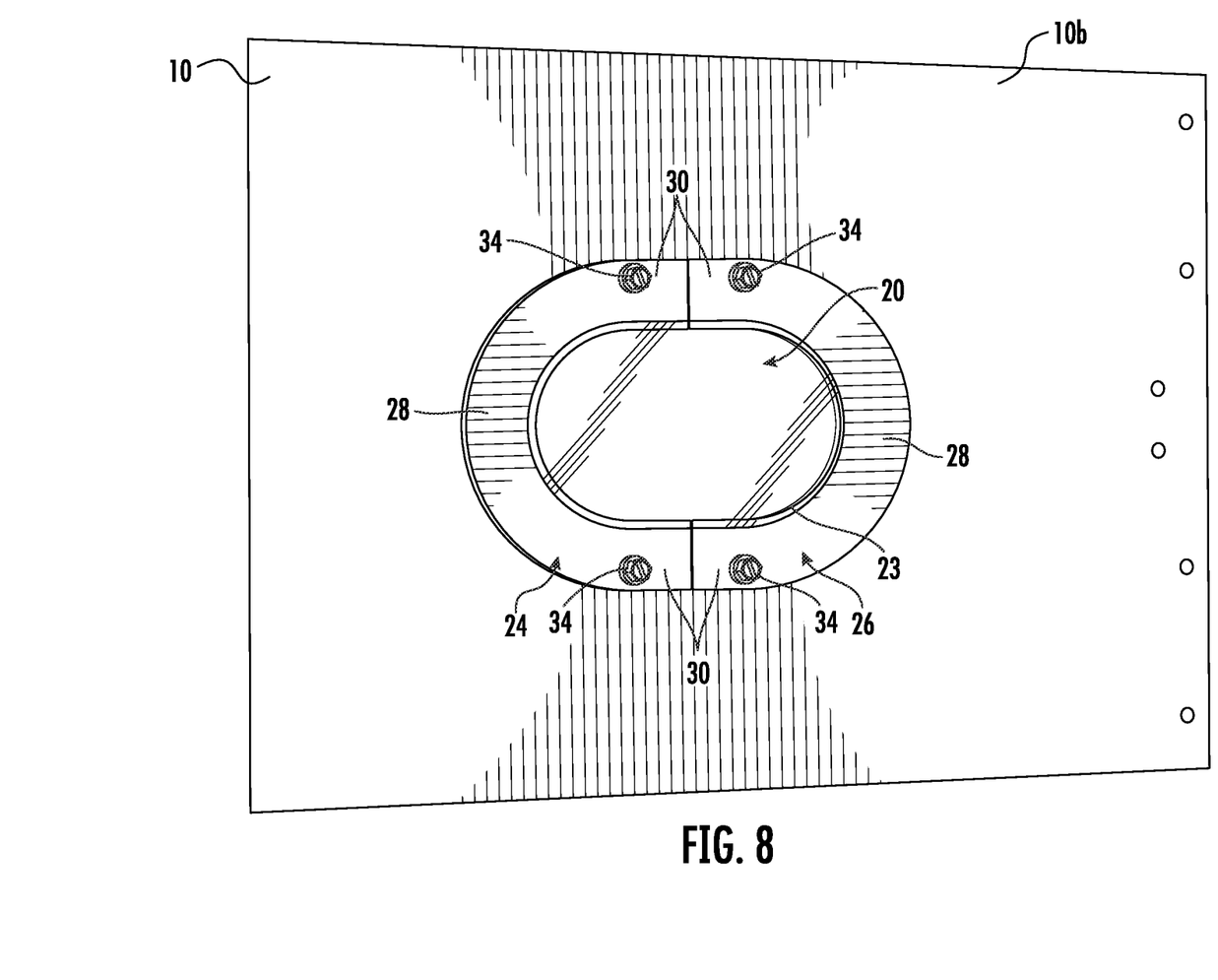
FIG. 8 is an inside view of an installed window within a grain trailer wall of an embodiment of the Grain Bin Window.
Figure 9:
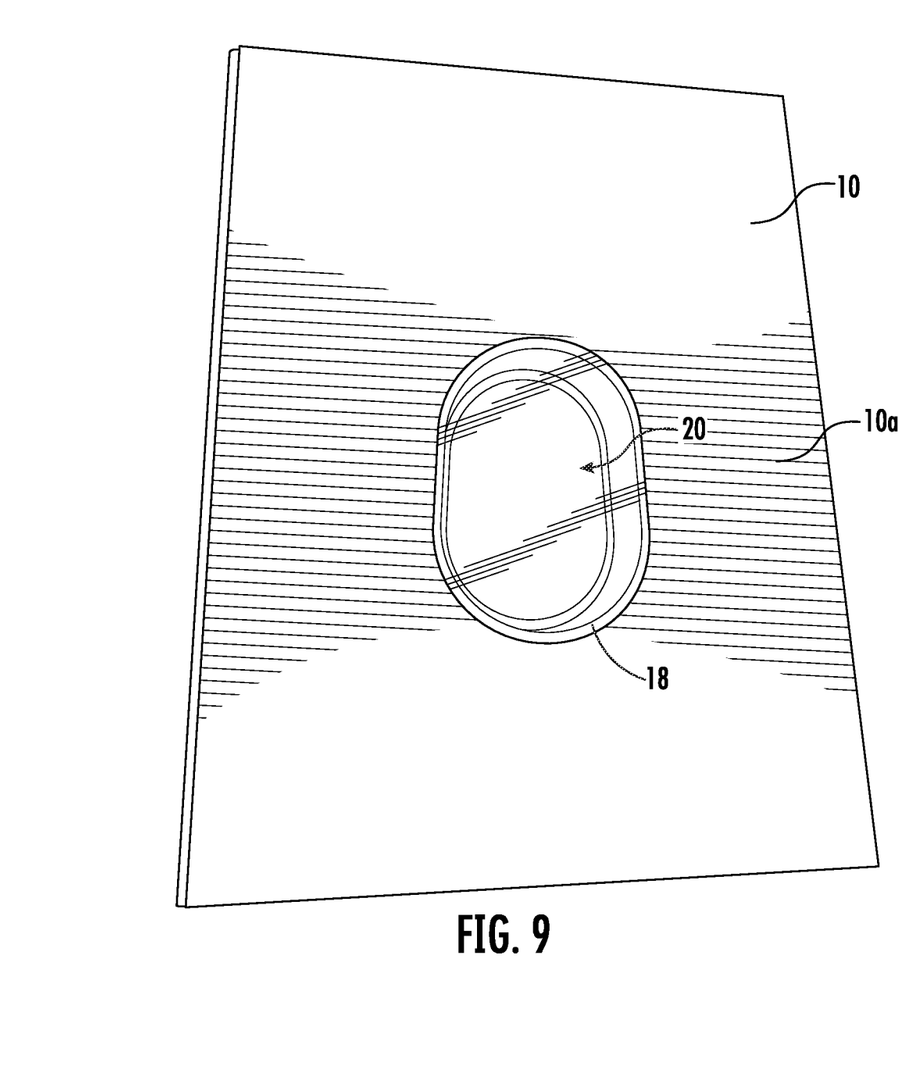
FIG. 9 is an outside view of an installed window within a grain trailer wall of an embodiment of the Grain Bin Window.

Fasteners may then be located in the through-holes 32 in the brackets 24, 26. The fasteners may be self-tapping screws 34 that bite into the aluminum side of the trailer wall 10 as shown in FIGS. 7-8. In this way, the brackets are semi-permanently affixed to the trailer wall, meaning they may never be removed, but should the need arise, the screws may be backed out, the window removed, and then placed back into the same self-tapped or drilled holes. The brackets may be affixed to the trailer wall in other ways known in the art, such as by adhesive, rivets, blind fasteners, machine screws, nails, or any other device or method to keep the brackets 24, 26 from sliding outwardly from the groove 20a, and allowing the window 20 to fall out. Ideally, the brackets 24, 26 are sized and shaped such that either bracket may be used on either side, making both installation and manufacturing of the brackets easier. However, it is contemplated that the brackets 24, 26 could be materially different, and may overlap to reduce the number of fasteners necessary for use. In other embodiments, the brackets may comprise a single bracket, a spring loaded clip, or any other mechanism that may fit into the groove 20a to keep the window 20 from falling out of the hole 12. As shown in at least FIG. 5C, brackets 24, 26 may be U-shaped brackets that are substantially the same size and shape as one another and when installed. a trailer engaging side 36 of brackets 24, 26 engage the wall of the trailer and the groove of the window assembly. The brackets 24, 26 each have a bracket inner length LI and a bracket inner width WI, and having a bracket outer length LO and a bracket outer width WO, the bracket inner width being smaller than a of the main stem portion and larger than a width of the groove of the stem and the bracket inner length being smaller than a length of the main stem portion and larger than a length of the groove of the stem and wherein the at least one bracket is partially spaced within the groove When the window 20 is installed, the compressible seal 22 forms a tight seal between the outer surface 10a of the trailer wall 10 and the holding flange 20b of the window 20. Because the depth of the window 20 may vary by small amounts, and the trailer wall 10 thickness may vary by small amounts, the compressible seal 22 both ensures that dirt, dust, and other particles are kept out of the inside of the grain trailer, but also serves to take up any tolerance in the sizes of the window and the trailer wall. FIGS. 8 and 9 show the installed window 20 from the inside and the outside of the trailer wall 10, respectively.

It is also contemplated within the disclosure that the window 20 could be installed from the inside out with all of the parts switched from the inside of the trailer to the outside and vice versa. It is further contemplated that the seal could be disposed on the bracket side of the window stem and located between the bracket and the side wall to seal off the window in this way, or even between both the holding flange and the side wall and the bracket and sidewall for more sealing protection.

While the embodiment shown in the Figures is a grain trailer or commodity trailer, it is contemplated that this window could be included in and installed within a wall of many other implements. For instance, the window could be installed within the window of a belt trailer, hopper bottom trailer, seed/fertilizer trailer, belly dump trailer, walking floor trailer, dump body, dump truck, end dump trailer, or any other type of trailer (the trailer of the embodiment shown in the figures is generically called "grain trailer," "grain bin," or "commodity trailer" throughout). The implement may further be something other than a trailer. These other implements may include vessels like pressure vessels or boat hulls, or any other vessel or building that requires material on the inside to be kept separated from material, air, or water on the outside of the vessel, or vice versa, while retaining the ability to see into or out of the trailer, vessel, or other implement. It is further contemplated that the window could be installed into a wall with a single material thickness by simply reducing the space between the holding flange and the groove, increasing the thickness of the seal, or a combination thereof.

One of the biggest advantages to this design is that an insert within the hole of the trailer or vessel is unnecessary. Because in the preferred embodiment, the side wall includes all of the structure necessary to keep the side wall at its designed thickness.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A commodity trailer comprising:
a commodity trailer comprising an interior volume, at least one hopper on the bottom of the commodity trailer, and a commodity trailer side wall wherein the commodity trailer side wall comprises at least one material thickness and has an inside surface and an outside surface;
a transparent commodity trailer interior viewing window assembly positioned above the at least one hopper and within the commodity trailer side wall such that the transparent commodity trailer viewing window extends from the inside surface to the outside surface of the commodity trailer side wall, the transparent commodity viewing window assembly comprising:

a stem having a stem length that is larger than its stem width that is a solid unitary component and wherein the stem has a main stem portion having at least one main stem portion side wall and a stem end portion at a first end of the stem with a groove therebetween that is recessed within the stem and is proximate the first end and wherein the stem further comprises a circumferential protruding portion at an opposite end of the stem opposite from the first end of the stem wherein the circumferential protruding portion protrudes beyond the at least one main stem portion side wall circumferentially about the at least one main stem portion side wall and wherein the circumferential protruding portion has a holding flange with a commodity trailer wall engaging surface that faces toward the first end of the stem;

wherein the commodity trailer wall engaging surface of the holding flange engages the outside surface and has a holding flange length that is longer than a length of the main stem portion and a holding flange width that is wider than a width of the main stem portion;

wherein the groove has commodity trailer wall engaging surface a recessed length that is shorter than the length of the main stem portion and a recessed width that is narrower than the width of the main stem portion;

a compressible seal disposed between the holding flange and the outside surface of the commodity trailer side wall;

at least one U-shaped bracket having a bracket inner length and a bracket inner width, and having a bracket outer length and a bracket outer width, the bracket inner width being smaller than a width of the main stem portion and larger than a width of the groove of the stem and the bracket inner length being smaller than the length of the main stem portion and larger than the length of the groove of the stem and wherein the at least one bracket is partially spaced within the groove; and wherein the at least one U-shaped bracket is fixed to the commodity trailer side wall.

2. The commodity trailer of claim 1, wherein the commodity trailer side wall comprises two sheets of material separated by a distance and wherein the two sheets of material are connected by at least one stringer that crosses the distance separating the two sheets of material of the commodity trailer side wall.

3. The commodity trailer of claim 2, wherein the commodity trailer side wall sheets of material comprise sheets of aluminum, and wherein the transparent commodity trailer interior viewing window assembly is an oblong and the transparent commodity trailer interior viewing window assembly is oriented in the commodity trailer side wall such that a side of the oblong transparent commodity trailer interior viewing window assembly that is longest is in a vertical direction.

4. The commodity trailer of claim 1, wherein the commodity trailer comprises a first transparent commodity trailer interior viewing window assembly positioned above a first hopper of the commodity trailer and a second transparent commodity trailer interior viewing window assembly positioned over a second hopper of the commodity trailer.

5. The commodity trailer of claim 1, wherein the at least one U-shaped bracket consists of a first bracket and a second bracket.

6. The commodity trailer of claim 5, wherein the first bracket and the second bracket are uniform and interchangeable and wherein the first bracket and the second bracket each have a planar top surface and a planar bottom surface with a first through-hole on a distal end of a first straight portion of the first bracket and third through-hole on a distal end of a first straight portion of the second bracket and a fourth through-hole on a distal end of a second straight portion of the second bracket.

7. The commodity trailer of claim 5, wherein the at least one U-shaped bracket is fixed to the commodity trailer side wall by self-tapping screws positioned within through holes in at least one bracket.

8. The commodity trailer of claim 7, wherein the screws are self-tapping screws configured to semi-permanently affix the at least one U-shaped bracket to the commodity trailer side wall.

9. A transparent commodity trailer interior viewing window assembly comprising:

a transparent stem having a main stem portion having at least one main stem portion side wall and a stem end portion at a first end of the stem with a groove therebetween that is recessed within the stem and is proximate the first end and wherein the stem further comprises a circumferential protruding portion at an opposite end of the stem opposite from the first end of the stem wherein the circumferential protruding portion protrudes beyond the at least one main stem portion side wall circumferentially about the at least one main stem portion side wall and wherein the circumferential protruding portion has a holding flange with a commodity trailer wall engaging surface that faces toward the first end of the stem;

wherein the commodity trailer wall engaging surface of the holding flange engages an outside surface of a commodity trailer wall during use;

a compressible seal disposed adjacent the holding flange and around the main stem portion; and at least one U-shaped bracket having a bracket inner length and a bracket inner width, and having a bracket outer length and a bracket outer width, the bracket inner width being smaller than a width of the main stem portion and larger than a width of the groove of the stem and the bracket inner length being smaller than a length of the main stem portion and larger than a length of the groove of the stem and wherein the at least one bracket is partially spaced within the groove during use of the transparent commodity trailer interior viewing window assembly.

10. The transparent commodity trailer interior viewing window assembly of claim 9, wherein the at least one U-shaped bracket comprises a first bracket and a second bracket that each fit on opposite sides of the groove from one another.

11. The transparent commodity trailer interior viewing window assembly of claim 10, wherein the first bracket and the second bracket have the same shape and size, and can be swapped with one another.

12. The transparent commodity trailer interior viewing window assembly of claim 9, wherein each of the at least one bracket comprises through-holes passing through a planar surface of each of the at least one bracket.

13. A trailer chosen from the group consisting of a belt trailer, a hopper bottom trailer, a seed trailer, a fertilizer trailer, a belly dump trailer, a walking floor trailer, a commodity trailer, a dump body, a dump truck, and an end dump trailer comprising:

a trailer wall comprising at least one material thickness, and having an inside trailer surface and an outside trailer surface;

an oblong, transparent window located in a hole of the trailer wall that passes from the inside trailer surface to the outside trailer surface, the transparent window comprising:

- a transparent cylindrical stem having a transparent cylindrical stem perimeter surface defined as the surface along a height of the transparent cylindrical stem, and an inside transparent cylindrical stem base surface that is oriented towards an inside surface of the trailer wall and outside transparent cylindrical stem top surface that is oriented towards an outside surface of the trailer wall;
- a holding flange disposed at one of (1) an inside cylindrical stem base surface or (2) an outside cylindrical stem top surface and wherein the holding flange has a holding flange perimeter extending than the stem perimeter;
- a groove adjacent to one of (1) the inside cylindrical stem base surface or (2) the outside cylindrical stem base surface and wherein the groove is on a opposite end of the transparent cylindrical stem of the holding flange, the groove having an inner perimeter bottom surface that is below the transparent cylindrical stem perimeter surface and wherein the groove is within the transparent cylindrical;

a compressible seal disposed between the holding flange and the outside surface of the trailer wall;

at least one open-ended bracket having a groove engaging portion and a side wall engaging portion, wherein the groove engaging portion is positioned within the groove and the trailer wall engaging portion is positioned adjacent the trailer wall; and wherein the bracket is affixed to the trailer wall.

14. The trailer of claim 13, wherein the trailer wall comprises two sheets of material separated by a distance and wherein the two sheets of material are connected by at least one stringer that crosses the distance and wherein each of the at least the bracket is affixed to the trailer wall using at least one of an adhesive, a rivet, a blind fastener, a screw, or a nail.

15. The trailer of claim 13, wherein the trailer is a grain trailer and comprises at least one hopper and the at least one hopper is positioned under the transparent window.

16. The trailer of claim 13, wherein the trailer comprises two transparent window assemblies and at least two hoppers with one of the two transparent window assemblies positioned above each hopper.

17. The trailer of claim 13, wherein the at least one open-ended bracket comprises a first open-ended bracket and a second open-ended bracket.

18. The trailer of claim 17, wherein the first open-ended bracket and the second open-ended bracket are uniform and interchangeable and wherein the first open-ended bracket and the open-ended second bracket each have a planar top surface and a planar bottom surface with a first through-hole on a distal end of a first straight portion of the first open-ended bracket and a second through-hole on a distal end of a second straight portion of the first open-ended bracket and a third through-hole on a distal end of a first straight portion of the second open-ended bracket and a fourth through-hole on a distal end of a second straight portion of the second open-ended bracket.

19. The trailer of claim 17, wherein the first open-ended bracket and the second open-ended bracket are U-shaped and fixed to the trailer wall by screws.

20. The trailer of claim 19, wherein the screws are self-tapping screws.

* * * * *